(12) United States Patent
Yu (10) Patent No.: US 8,879,536 B2
(45) Date of Patent: Nov. 4, 2014

(54) APPARATUS AND METHOD FOR TIME SYNCHRONIZATION

(71) Applicant: Electronics and Telecommunications Research Institute, Daejeon (KR)

(72) Inventor: Bong-Guk Yu, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 116 days.

(21) Appl. No.: 13/646,119

(22) Filed: Oct. 5, 2012

(65) Prior Publication Data
US 2013/0089030 A1    Apr. 11, 2013

(30) Foreign Application Priority Data

Oct. 7, 2011 (KR) .................. 10-2011-0102681
Sep. 25, 2012 (KR) .................. 10-2012-0106637

(51) Int. Cl.
*H04W 56/00* (2009.01)
*H04W 84/20* (2009.01)

(52) U.S. Cl.
CPC .......... *H04W 56/0015* (2013.01); *H04W 84/20* (2013.01)

USPC ........................................... 370/350; 370/503

(58) Field of Classification Search
USPC .................... 370/310, 328, 329, 350, 503
See application file for complete search history.

(56) References Cited

U.S. PATENT DOCUMENTS

2008/0291863 A1* 11/2008 Agren ........................... 370/315
2010/0054237 A1*  3/2010 Han et al. ...................... 370/350
2010/0087206 A1*  4/2010 Touboul et al. ............. 455/456.1

FOREIGN PATENT DOCUMENTS

KR      1020090083583        8/2009
KR      1020100114350       10/2010

* cited by examiner

*Primary Examiner* — Kerri Rose
(74) *Attorney, Agent, or Firm* — Nelson Mullins Riley & Scarborough LLP (57) ABSTRACT

An apparatus for time synchronization of a femtocell base station receives, via neighboring macrocell base stations adjacent to a femtocell base station, timing packets generated by timing servers directly connected to the neighboring macrocell base stations, and if time synchronization using a GPS satellite is impossible, obtains system time information from a timing packet received via one corresponding to a master base station, among the neighboring macrocell base stations, and performs time synchronization.

10 Claims, 5 Drawing Sheets

APPARATUS AND METHOD FOR TIME SYNCHRONIZATION

CROSS-REFERENCE TO RELATED APPLICATION

This application claims priority to and the benefit of Korean Patent Application Nos. 10-2011-0102681 and 10-2012-0106637 filed in the Korean Intellectual Property Office on Oct. 7, 2011 and Sep. 25, 2012, the entire contents of which are incorporated herein by reference.

BACKGROUND OF THE INVENTION (a) Field of the Invention

The present invention relates to an apparatus and method for time synchronization, and more particularly, to an apparatus and method for time synchronization of a femtocell base station.

(b) Description of the Related Art

The types of mobile communication services are rapidly shifting from conventional voice to data, and data traffic is expected to grow rapidly as smartphones proliferate. Therefore, a femtocell appeared as a way of making efficient use of limited frequency resources, based on the idea that a small base station is installed in a home in order to increase service capacity by shortening the radio reaching distance of a base station.

However, a femtocell base station is generally installed in a building, and therefore shows significantly low performance in receiving a time information signal from a conventional GPS satellite. Thus, the problem of synchronization with an existing base station (e.g., a macrocell base station) arises.

To solve this problem of synchronization, a variety of synchronization acquisition methods have been devised. These methods include an Assisted GPS method for receiving information about a GPS satellite, such as Almanac data, ephermeris data, etc from an assistance server through a wired network, a wireless connection technology-method for receiving and using a synchronization radio signal from a neighboring macrocell base station, and a network-based method using a network synchronization protocol, such as a PTP (Precision Time Protocol).

Among these various types of synchronization methods, the assisted GPS method or the wireless connection technology-based method requires additional high costs in terms of the implementation of a femtocell base station. Thus, the network-based method, which can be implemented at relatively low costs, has been favored up to now.

The conventional network-based method is realized through the reception of time information provided by a PTP (Precision Time Protocol) and an NTP (Network Timing Protocol) protocol according to the IEEE 1588 standard which were developed as a way of synchronization of an asynchronous network such as Ethernet, in order to maintain time synchronization with a conventional macrocell base station.

This network-based method is a method in which a timing server connected to a wired internet network transmits a timing packet through the wired internet network and a femtocell base station, a client, extracts a synchronization signal contained in the received timing packet.

However, the accuracy of synchronization of the network-based method depends largely on imbalance between uplink and downlink packet delays that a non-dedicated line service such as x-DSL or FTTH involves. That is, packet transmission delay increase irregularly due to an increase in traffic volume on an asynchronous network for timing packet transmission, synchronization errors become larger in proportion to the number of femtocells and the size of the network.

SUMMARY OF THE INVENTION

The present invention has been made in an effort to provide an apparatus and method for time synchronization which are capable of quickly synchronizing with a macrocell base station without a delay caused by the traffic volume in a network.

An exemplary embodiment of the present invention provides an apparatus for time synchronization of a femtocell base station in a wireless communication system including a plurality of macrocell base stations and at least one femtocell base station located within the cell coverage of each macrocell base station. The time synchronization apparatus includes a neighbor list generation unit, a reception unit, and a synchronization unit. The neighbor list generation unit generates a neighboring macrocell base station list containing information regarding neighboring macrocell base stations adjacent to a femtocell base station. The reception unit receives, via the neighboring macrocell base stations, timing packets generated by timing servers directly connected to the neighboring macrocell base stations. The synchronization unit obtains, if time synchronization using a GPS satellite is impossible, system time information from a timing packet received via one corresponding to a master base station, among the neighboring macrocell base stations, and performs time synchronization.

The time synchronization apparatus may further include a master base station setting unit. The master base station setting unit sets one of the neighboring macrocell base stations as the master base station and another one of the neighboring base stations as a candidate master base station.

If a network synchronization failure occurs after the time synchronization, the synchronization unit obtains system time information from a timing packet received via the macrocell base station corresponding to the candidate master base station, and performs time synchronization.

The time synchronization apparatus may further include a reception unit for receiving a time information signal from the GPS satellite, and the synchronization unit may determine whether the time synchronization using the GPS satellite is impossible, based on the reception quality of the time information signal.

If it is determined that the time synchronization using the GPS satellite is possible, the synchronization unit may obtain the system time information from the time information signal, and perform time synchronization.

Another exemplary embodiment of the present invention provides a method for time synchronization of a femtocell base station in a wireless communication system including a plurality of macrocell base stations and at least one femtocell base station located within the cell coverage of each macrocell base station. The time synchronization method includes: determining whether time synchronization using a GPS satellite is impossible; receiving, via neighboring macrocell base stations adjacent to a femtocell base station, timing packets generated by timing servers directly connected to the neighboring macrocell base stations; if the time synchronization using the GPS satellite is impossible, obtaining system time information from a timing packet received via one corresponding to a master base station, among the neighboring macrocell base stations, and performing time synchronization. The timing packet may include the system time information that the macrocell base station corresponding to the master base station obtains from the GPS satellite.

The time synchronization method may further include setting one of the neighboring macrocell base stations as the master base station and another one of the neighboring base stations as a candidate master base station.

The time synchronization method may further include, if a network synchronization failure occurs after the time synchronization, obtaining system time information from a timing packet received via the macrocell base station corresponding to the candidate master base station, and performing time synchronization.

Yet another exemplary embodiment of the present invention provides a method for time synchronization of a macrocell base station in a wireless communication system including a plurality of macrocell base stations and at least one femtocell base station located within the cell coverage of each macrocell base station. The time synchronization method includes: receiving a time information signal containing system time information from a GPS satellite; performing time synchronization using the system time information; transmitting the system time information to a timing server directly connected to the macrocell base station; receiving a timing packet containing the system time information from the timing server; and transmitting the timing packet to neighboring femtocell base stations.

The time synchronization method may further include generating a neighboring femtocell base station list containing information regarding the neighboring femtocell base stations. The neighboring femtocell base station list may include femtocell base stations located within the cell coverage of the macrocell base station and femtocell base stations located within the coverage of a neighboring macrocell adjacent to the cell coverage of the macrocell base station.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising", will be understood to imply the inclusion of stated elements but not the exclusion of any other elements.

Now, an apparatus and method for time synchronization according to an exemplary embodiment of the present invention will be described in detail with reference to the drawings.

Figure 1:
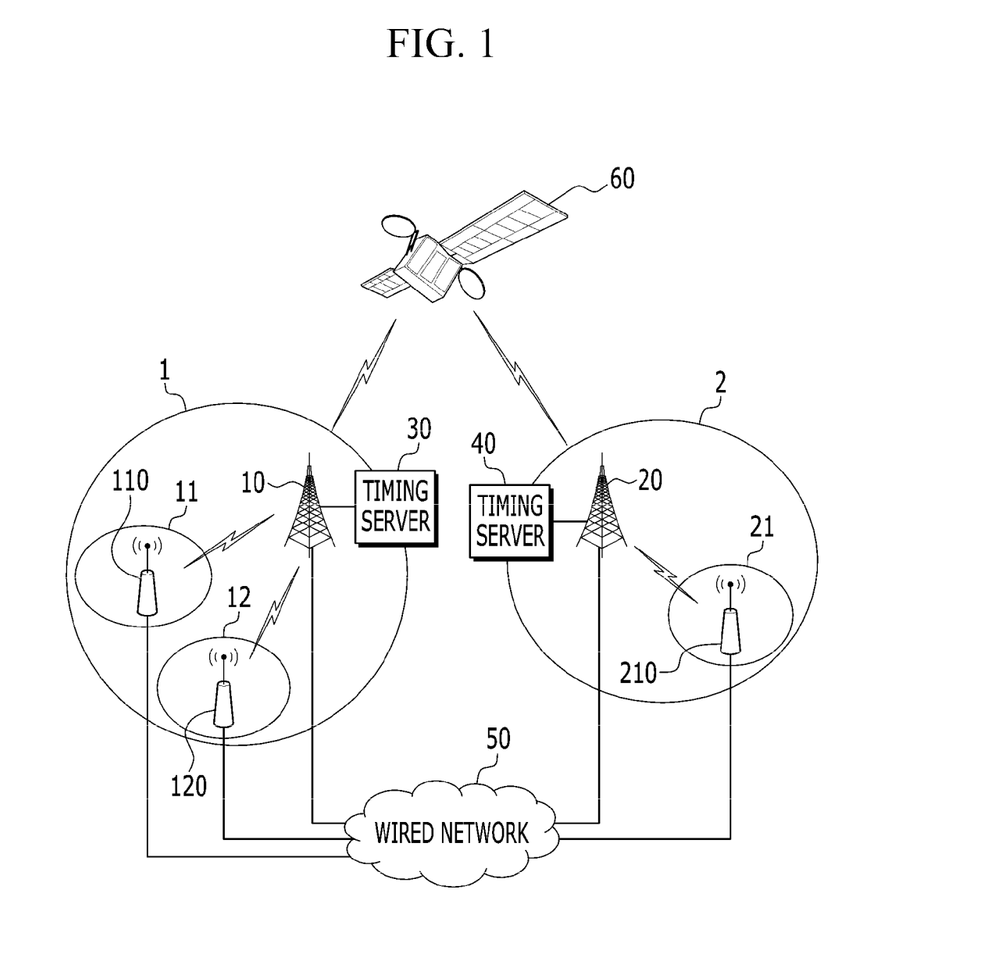
FIG. 1 is a view showing an example of a wireless communication system according to an exemplary embodiment of the present invention.

FIG. 1 is a view showing an example of a wireless communication system according to an exemplary embodiment of the present invention.

Referring to FIG. 1, the wireless communication system according to the exemplary embodiment of the present invention includes at least one femtocell 11 and 12/21 within a macrocell 1/2.

The macrocell 1 and 2 has a wide cell radius of, e.g., about 1 km, and the femtocell 11, 12, and 21 has a radius smaller than the radius of the macrocell 1 and 2. For example, the femtocell 11, 12, and 21 may include a microcell having a radius of 50 to 100 m or a Wi-Fi hotspot.

The macrocell 1 and 2 includes a macrocell base station 10 and 20 that manages the macrocell 1 and 2. The femtocell 11, 12, and 21 includes a femtocell base station 110, 120, and 210 that manages the femtocell 11, 12, and 21.

The femtocell base station 110, 120, and 210 is usually installed in a shadow area inside a building or a densely populated area, and is connected to the macrocell base station 10 and 20 through a wired network 50.

The femtocell base stations 10 and 20 and the femtocell base stations 110, 120, and 210 receive a time information signal containing system time information from a GPS satellite 60, and perform time synchronization between the macrocell base stations 10 and 20, between the femtocell base stations 110, 120, and 210, and between the macrocell base stations 10 and 20 and the femtocell base stations 110, 120, and 210.

However, the femtocell base stations 110, 120, and 210 show significantly low performance in receiving a time information signal from the GPS satellite 60 due to their installation positions, as compared to the macrocell base stations 10 and 20. For this reason, time synchronization between the macrocell base stations 10 and 20 and the femtocell base stations 110, 120, and 210 may not be properly implemented.

To achieve time synchronization between the macrocell base stations 10 and 20 and the femtocell base stations 110, 120, and 210, the macrocell base stations 10 and 20 receive a time information signal from the GPS satellite 60 and obtain system time information, and transmits the obtained system time information to timing servers 30 and 40 respectively connected to the macrocells 10 and 20.

The timing servers 30 and 40 generate a timing packet containing the system time information received from the macrocell base stations 10 and 20, respectively, and transmit the timing packet to femtocell base stations in a neighboring femtocell base station list of the macrocell base stations 10 and 20. The timing packet may be transmitted to the corresponding femtocell base stations through the macrocell base stations 10 and 20 and the wired network 50.

If time synchronization using the time information signal from the GPS satellite 60 is impossible, the femtocell base stations 110, 120, and 210 obtain system time information from a timing packet received via at least one of the macrocell base stations 10 and 20 and perform time synchronization.

Particularly, the femtocell base stations 110, 120, and 210 set one of the macrocell base stations 10 and 20 as a master base station and the other one as a candidate master base station. Thus, if a network synchronization failure occurs in the system time information obtained from a timing packet received via the master base station, they time synchronization may be performed again using the system time information obtained from a timing packet received via the candidate master base station.

That is, a plurality of timing servers 30 and 40 are placed to secure time synchronization of the femtocell base stations. This can reduce time synchronization errors when the number of femtocells increases and the size of the network becomes larger.

Figure 2:
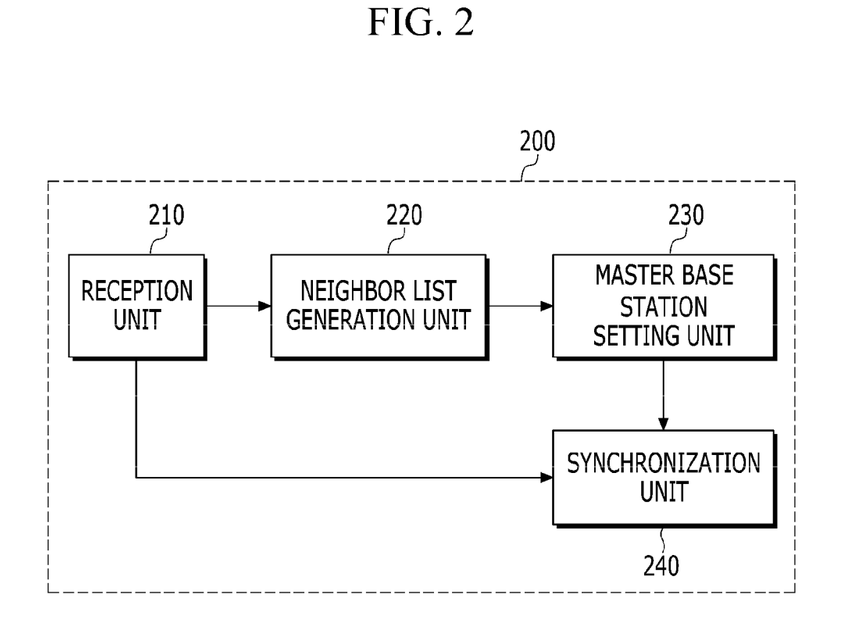
FIG. 2 is a view showing an apparatus for time synchronization of a femtocell base station according to an exemplary embodiment of the present invention.
Figure 3:
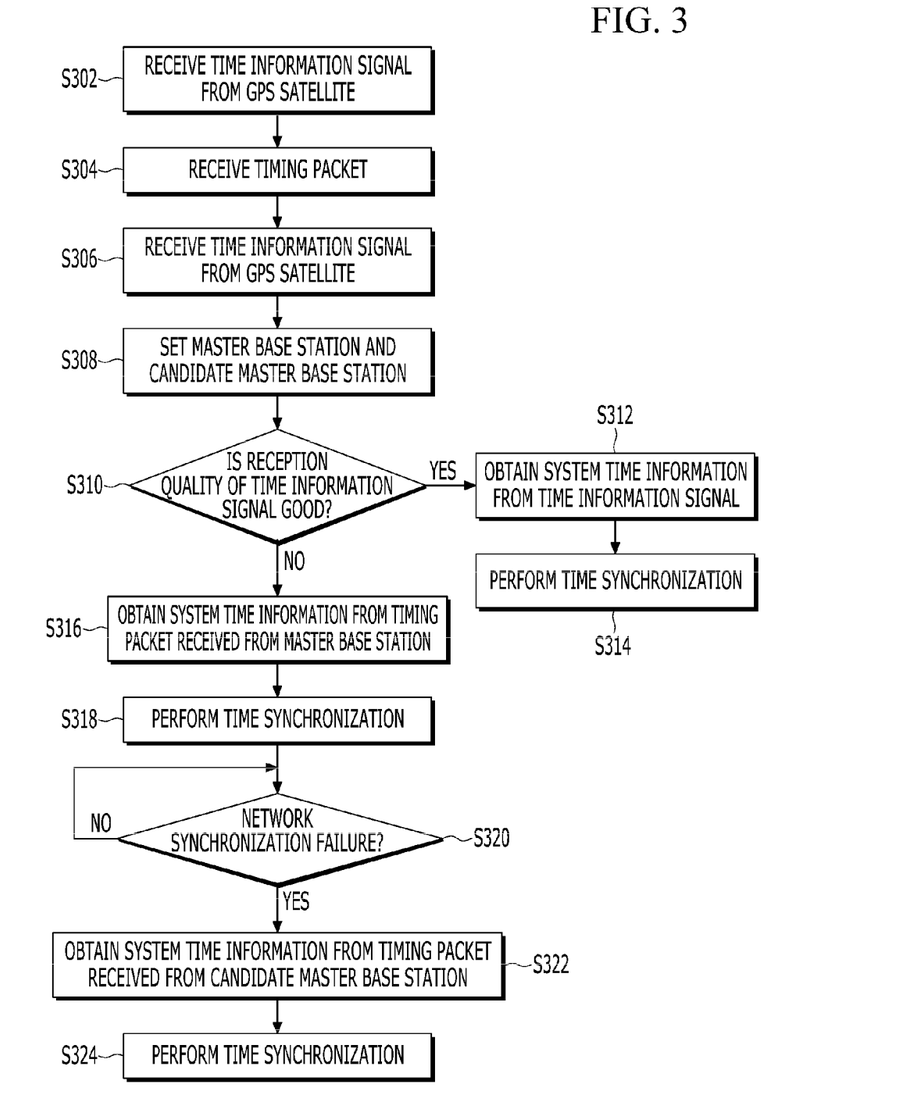
FIG. 3 is a flowchart showing a method for time synchronization of a femtocell base station according to an exemplary embodiment of the present invention.

FIG. 2 is a view showing an apparatus for time synchronization of a femtocell base station according to an exemplary embodiment of the present invention. FIG. 3 is a flowchart showing a method for time synchronization of a femtocell base station according to an exemplary embodiment of the present invention.

For convenience of explanation, a description of FIG. 2 is made with respect to the time synchronization apparatus 200 of the femtocell base station 110, among the femtocell base stations 110, 120, and 210 shown in FIG. 1, and a time synchronization apparatus of the other femtocell base stations 120 and 210 may be configured in the same manner as the time synchronization apparatus of the femtocell base station 110.

Referring to FIG. 2, the time synchronization apparatus 200 includes a reception unit 210, a neighbor list generation unit 220, a master base station setting unit 230, and a synchronization unit 240.

Referring to FIG. 3, the reception unit 210 receives a time information signal from the GPS satellite 60 (S302). The reception unit 210 receives a timing packet from at least one macrocell base station 10 and 20 in a neighboring macrocell base station list (S304).

The neighbor list generator 220 generates a neighboring macrocell base station list (S306). For example, the neighboring macrocell base station list may include the macrocell base stations 10 and 20 whose RSSI (Received Signal Strength Indication) is greater than a predetermined threshold.

The master base station setting unit 230 sets one of the neighboring macrocell base stations 10 and 20 in the neighboring macrocell base station list as a master base station and the other one as a candidate master base station (S308). The master base station setting unit 230 may set the macrocell base station (e.g., 10) having the largest RSSI, among the neighboring macrocell base stations 10 and 20 in the neighboring macrocell base station list, as the master base station, and set the macrocell base station (e.g., 20) having the next largest RSSI as the candidate master base station.

The synchronization unit 240 performs time synchronization with the macrocell base stations 10 and 20.

The synchronization unit 240 measures the reception quality of a time information signal from the GPS satellite 60, and determines whether the reception quality of the time information signal is good (S310).

Upon judging that the reception quality of the time information signal is good (S310), the synchronization unit 240 performs time synchronization in the GPS mode. A predetermined threshold may be set in order to determine whether the reception quality is good. The threshold may differ depending on the method for measuring reception quality. The threshold may be set by the administrator of the wireless communication system, and may be varied. For example, the RSSI of the time information signal may be used to measure the reception quality. If the RSSI of the time information signal is greater than a predetermined threshold, the synchronization unit 240 may determine that the reception quality of the time information signal is good; otherwise, it determines that the reception quality is not good.

The GPS mode indicates that time synchronization is performed using a time information signal from the GPS satellite 30. In the GPS mode, the synchronization unit 240 obtains system time information from the time information signal (S312), and performs time synchronization using the system time information (S314).

If it is determined that the reception quality of the time information signal is not good (S310), the synchronization unit 240 switches its synchronization mode from the GPS mode to the network-based mode, and performs time synchronization in the network-based mode.

The network-based mode indicates that time synchronization is performed using a timing packet received through the wired network 50. The synchronization unit 240 obtains system time information from a timing packet received from the master base station (S316), and performs time synchronization using the obtained system time information (S318).

If a network synchronization failure occurs due to a failure in the master base station after the time synchronization (S320), the synchronization unit 240 obtains system time information from the timing packet received from the candidate master base station (S322), and performs time synchronization using the obtained system time information (S324).

In this way, time synchronization with the femtocell base station 110 may be achieved.

As seen from above, the timing packet is transmitted only to the femtocell base stations in some macrocells, rather than to the entire network, by the timing servers 30 and 40 respectively connected to the macrocell base stations 10 and 20, and therefore inconsistency in system time information, which increases in proportion to the size and traffic volume of the entire network, can be minimized and time synchronization of the entire system can be maintained.

Figure 4:
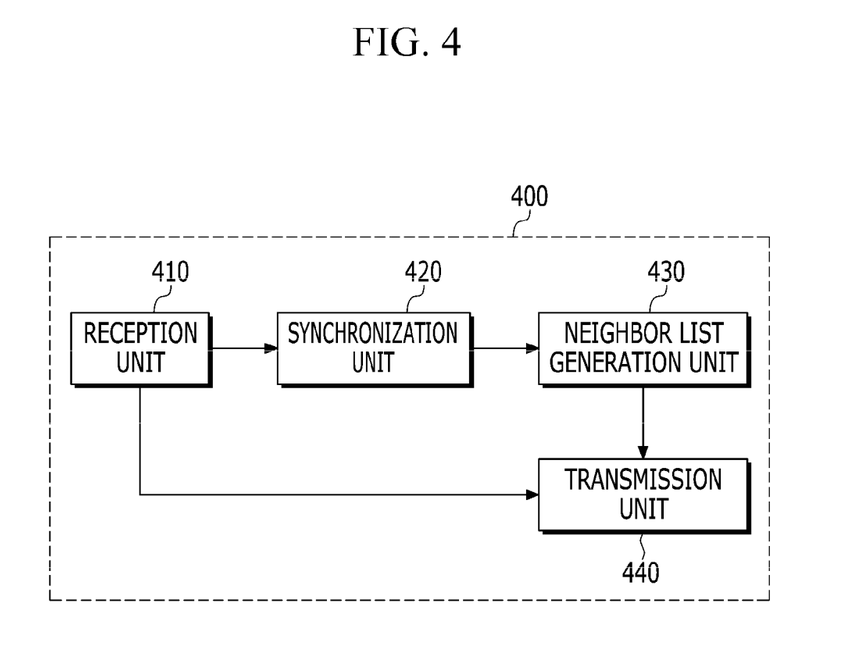
FIG. 4 is a view showing an apparatus for time synchronization of a macrocell base station according to an exemplary embodiment of the present invention.
Figure 5:
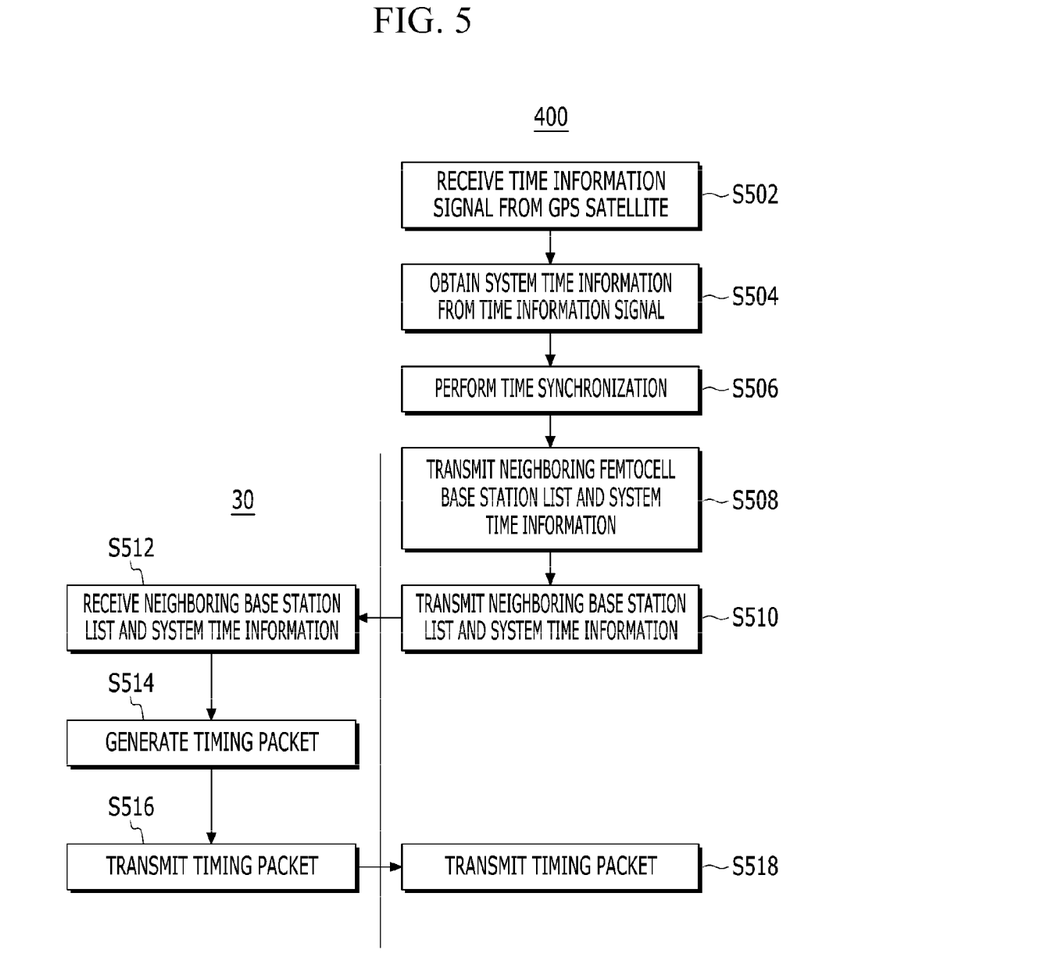
FIG. 5 is a view showing a method for time synchronization of a macrocell base station according to an exemplary embodiment of the present invention.

FIG. 4 is a view showing an apparatus for time synchronization of a macrocell base station according to an exemplary embodiment of the present invention. FIG. 5 is a view showing a method for time synchronization of a macrocell base station according to an exemplary embodiment of the present invention.

A description of FIG. 4 focuses on one macrocell base station 10, among the macrocell base stations 10 and 20 shown in FIG. 1, and the macrocell base station 20 can operate in the same way as the macrocell bas station 10.

Referring to FIG. 4, the time synchronization apparatus 400 of the macrocell base station 10 includes a reception unit 410, a synchronization unit 420, a neighbor list generation unit 430, and a transmission unit 440.

Referring to FIG. 5, the reception unit 410 receives a time information signal from the GPS satellite 60 (S502).

The synchronization unit 420 obtains system time information using the time information signal received from the GPS satellite 60 (S504), and performs time synchronization using the obtained system time information (S506).

The neighbor list generation unit 430 generates a neighboring femtocell base station list (S508). For example, the neighboring femtocell base station list may include the femtocell base station 210 of the neighboring macrocell 2 adjacent to the macrocell 1, as well as the femtocell base stations 110 and 120 of the macrocell 11 managed by the macrocell base station 10.

The transmission unit 440 transmits the obtained system time information and the neighboring femtocell base station list to the timing server 30 (S510).

Upon receiving the system time information and the neighboring femtocell base station list from the time synchronization apparatus 400 of the macrocell base station 10 (S512), the timing server 30 generates a timing packet containing the received system time information (S514), and transmits the generated timing packet to the femtocell base stations 110, 120, and 210 in the neighboring femtocell base station list through the time synchronization apparatus 400 of the macrocell base station 10 (S516 to S518). Hereupon, the timing packet may be received by the reception unit 410, and then transmitted to the femtocell base stations 110, 120, and 210 in the neighboring femtocell base station list by the transmission unit 440.

According to an embodiment of the present invention, a femtocell base station can quickly obtain time synchronization information of a macrocell base station without a delay caused by traffic of a network, and achieve fast synchronization restoration time because it uses GPS time synchronization information of neighboring macrocell base stations in order to maintain time synchronization with its macrocell base station.

Moreover, the present invention is easily applicable to traffic volume-distributed small-size base stations and relays which will emerge in the future, as well as to the femtocell base station.

The exemplary embodiments of the present invention may also be implemented by a program realizing functions corresponding to the construction of the embodiment, and a recording medium on which the program is recorded, other than the apparatus and/or method described above. Such implementation may be easily made from the disclosure of the above embodiments by those skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. An apparatus for time synchronization of a femtocell base station in a wireless communication system comprising a plurality of macrocell base stations and at least one femtocell base station located within the cell coverage of each macrocell base station, the apparatus comprising:
   a neighbor list generation unit that generates a neighboring macrocell base station list containing information regarding neighboring macrocell base stations adjacent to the femtocell base station;
   a reception unit that receives, via the neighboring macrocell base stations, timing packets generated by timing servers directly connected to the neighboring macrocell base stations;
   a master base station setting unit that sets one of the neighboring macrocell base stations as a master base station and another one of the neighboring macrocell base stations as a candidate master base station; and
   a synchronization unit that obtains, if time synchronization using a GPS satellite is impossible, system time information from a timing packet received via one corresponding to the master base station, among the neighboring macrocell base stations, and performs time synchronization.

2. The apparatus of claim 1, wherein, if a network synchronization failure occurs after the time synchronization, the synchronization unit obtains system time information from a timing packet received via the macrocell base station corresponding to the candidate master base station, and performs time synchronization.

3. The apparatus of claim 1, further comprising a reception unit for receiving a time information signal from the GPS satellite, and
   the synchronization unit determines whether the time synchronization using the GPS satellite is impossible, based on the reception quality of the time information signal.

4. The apparatus of claim 3, wherein, if it is determined that the time synchronization using the GPS satellite is possible, the synchronization unit obtains the system time information from the time information signal, and perform time synchronization.

5. The apparatus of claim 1, wherein the system time information is contained in the time information signal that the macrocell base station corresponding to the master base station receives from the GPS satellite.

6. A method for time synchronization of a femtocell base station in a wireless communication system comprising a plurality of macrocell base stations and at least one femtocell base station located within the cell coverage of each macrocell base station, the method comprising:
   determining whether time synchronization using a GPS satellite is impossible;
   receiving, via neighboring macrocell base stations adjacent to a femtocell base station, timing packets generated by timing servers directly connected to the neighboring macrocell base stations;
   setting one of the neighboring macrocell base stations as a master base station and another one of the neighboring macrocell base stations as a candidate master base station; and
   if the time synchronization using the GPS satellite is impossible, obtaining system time information from a timing packet received via one corresponding to the master base station, among the neighboring macrocell base stations, and performing time synchronization,
   wherein the timing packet contains the system time information that the macrocell base station corresponding to the master base station obtains from the GPS satellite.

7. The method of claim 6, further comprising, if a network synchronization failure occurs after the time synchronization, obtaining system time information from a timing packet received via the macrocell base station corresponding to the candidate master base station, and performing time synchronization.

8. The method of claim 6, wherein the determining comprises:
   receiving a time information signal from the GPS satellite; and
   determining whether the time synchronization using the GPS satellite is impossible, based on the reception quality of the time information signal.

9. The method of claim 8, further comprising, if it is determined that the time synchronization using the GPS satellite is possible, performing time synchronization using the system time information contained in the time information signal received from the GPS satellite.

10. A method for time synchronization of a macrocell base station in a wireless communication system including a plurality of macrocell base stations and at least one femtocell base station located within the cell coverage of each macrocell base station, the method comprising:
   receiving a time information signal from the GPS satellite;
   performing time synchronization using the system time information;
   transmitting the system time information to a timing server directly connected to the macrocell base station;

receiving a timing packet containing the system time information from the timing server; and transmitting the timing packet to neighboring femtocell base stations, and generating a neighboring femtocell base station list containing information regarding the neighboring femtocell base stations, wherein the neighboring femtocell base station list comprises femtocell base stations located within the cell coverage of the macrocell base station and femtocell base stations located within the coverage of a neighboring macrocell adjacent to the cell coverage of the macrocell base station.

* * * * *